US012810209B2

(12) United States Patent
Prasad et al.

(10) Patent No.: US 12,810,209 B2
(45) Date of Patent: Nov. 24, 2026

(54) MEMORY-EFFICIENT LARGE LANGUAGE MODEL

(71) Applicant: BMC Software, Inc., Houston, TX (US)

(72) Inventors: Vikas Prasad, Pune (IN); Siva Sai Nellore, Bangalore (IN)

(73) Assignee: BMC Helix, Inc., Houston, TX (US)

( * ) Notice: Subject to any disclaimer, the term of this patent is extended or adjusted under 35 U.S.C. 154(b) by 407 days.

(21) Appl. No.: 18/622,568

(22) Filed: Mar. 29, 2024

(65) Prior Publication Data

US 2025/0307696 A1 Oct. 2, 2025

(51) Int. Cl.
*G06N 20/00* (2019.01)

(52) U.S. Cl.
CPC .................................... *G06N 20/00* (2019.01)

(58) Field of Classification Search
CPC ............................... G06N 3/045; G06N 20/00
See application file for complete search history.

(56) References Cited

U.S. PATENT DOCUMENTS 11,508,360 B2 * 11/2022 Peng ........................ G06F 40/44
2019/0052799 A1 * 2/2019 Liu ...................... G06F 18/2148
2019/0348997 A1 * 11/2019 Lee ...................... H03M 7/3066
2022/0374766 A1 * 11/2022 Thorsley .............. G06N 3/0495
2022/0383078 A1 * 12/2022 Hou .......................... G06N 3/06
2023/0245431 A1 * 8/2023 Lanni ................... G06N 3/0464
382/128
2024/0007414 A1 * 1/2024 Jain ......................... G06F 9/505

* cited by examiner

*Primary Examiner* — Maikhanh Nguyen
(74) *Attorney, Agent, or Firm* — Brake Hughes Bellermann LLP

(57) ABSTRACT

Systems and techniques train a first large language model (LLM) using domain data to output a second LLM, the second LLM having a first memory size. The systems and techniques generate predictions by both the first LLM and the second LLM using a same input data for generating the predictions. The systems and techniques compute a threshold by comparing the predictions by the first LLM and the second LLM. The systems and techniques iteratively adjusting a set of attention heads of the second LLM by comparing new predictions from the second LLM to the threshold using the same input data. The systems and techniques generate a third LLM having a different set of attention heads than the set of attention heads of the second LLM, the third LLM having a second memory size that is smaller than the first memory size of the second LLM.

16 Claims, 4 Drawing Sheets

200

300

MEMORY-EFFICIENT LARGE LANGUAGE MODEL

TECHNICAL FIELD

This description relates to a memory-efficient large language model.

BACKGROUND

A technical challenge with using a large language model on a computing device or across multiple computing devices is that maintaining a high accuracy of the large language model uses a large amount of computing resources, including memory. Stated another way, the surge in memory consumption by the large language model while retaining high accuracy is a challenging technical problem.

SUMMARY

In some aspects, the techniques described herein relate to a computer-implemented method including training a first large language model using domain data to output a second large language model, where the second large language model has a first memory size. The first large language model and the second large language model both generate predictions using a same input data. A threshold is computed by comparing the predictions by the first large language model and the second large language model. A set of attention heads of the second large language model are iteratively adjusted by comparing new predictions from the second large language model to the threshold using the same input data. A third large language model having a different set of attention heads than the set of attention heads of the second large language model is generated. The third large language model has a second memory size that is smaller than the first memory size of the second large language model.

According to other general aspects, a computer program product may perform the instructions of the computer-implemented method. According to other general aspects, a system may include at least one memory, including instructions, and at least one processor that is operably coupled to the at least one memory and that is arranged and configured to execute instructions that, when executed, cause the at least one processor to perform the instructions of the computer program product and/or the operations of the computer-implemented method.

The details of one or more implementations are set forth in the accompanying drawings and the description below. Other features will be apparent from the description and drawings, and from the claims.

DETAILED DESCRIPTION

Figure 1:
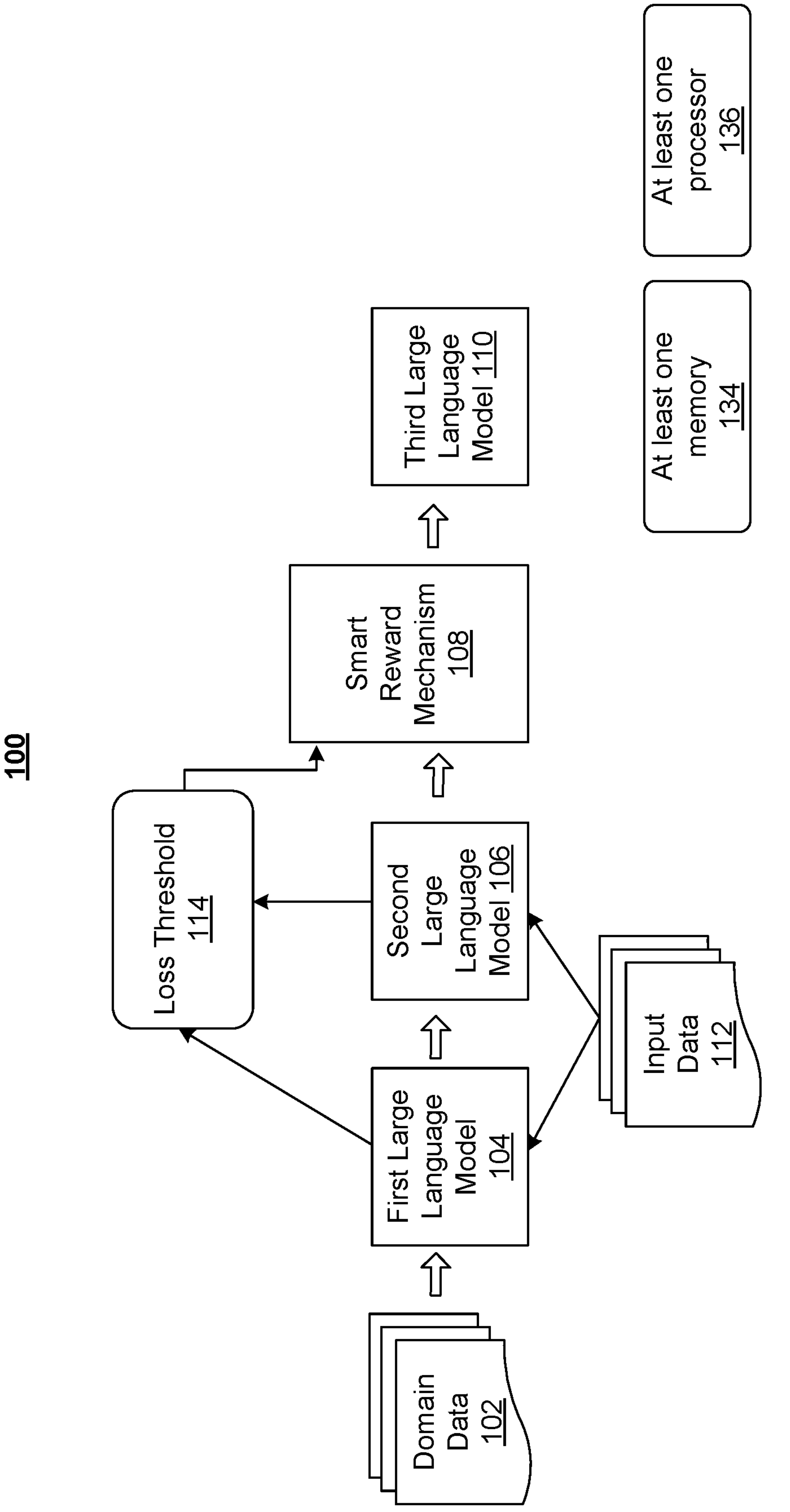
FIG. 1 is a block diagram of a system for improving the computing resource efficiency of a large language model.

A large language model is a deep learning algorithm that can perform a variety of natural language processing tasks.

A large language model is a type of generative artificial intelligence that is trained using large text datasets to produce and output content, such as textual content. For example, a large language model can be used to receive an input, to process the input, and to output a text summarization, text generation, text classification, or answers to questions, to name just a few example processing and output types.

In some implementations, a large language model uses a transformer model that is trained using very large datasets. This enables the large language model to recognize, translate, predict, or generate text or other content. The transformer model includes an encoder and a decoder. The transformer model processes data by tokenizing the input, then simultaneously performing mathematical operations to determine relationships between tokens. The transformer model works with self-attention mechanisms, which enables the transformer model to learn more quickly than other models. For example, the self-attention mechanisms enable the transformer model to consider different parts of the text sequence, or the entire context of a sentence, to generate predictions.

A large language model may be implemented on a processing unit or across multiple processing units. For example, in some implementations, a large language model may be implemented on a graphics processing unit (GPU) or across multiple GPUs. A GPU typically includes memory arranged in a memory hierarchy to support the processing elements of the GPU. The size of a large language model may determine the size and number of GPUs needed to process the large language model. As the size of the large language model increases, then larger and/or more GPUs may be needed to process the large language model. The size of the large language model may increase due to having to maintain a high accuracy of the outputs provided by the large language model.

In some conventional approaches, certain model parameters may be identified and removed from the large language model to reduce the complexity and the size of the large language model. However, these approaches often lack fine-grained control over which parts of the large language model are removed, potentially leading to a loss of accuracy. In some other conventional approaches, compression and/or quantization may be used to represent the weights in the large language model with fewer bits. Again, these approaches may not address the underlying architectural complexity of the large language model and may not preserve the accuracy and linguistic performance of the large language model.

Described herein are systems and techniques that provide technical solutions to the technical problems of using a large language model in a processing unit in a memory-efficient manner. The technical solutions reduce the computing resources (e.g., GPU resources, memory consumption, etc.) of the large language model on a computing device or across multiple computing devices while retaining a high accuracy. In general, the technical solutions described herein include systems and techniques that use reinforcement learning, fine-tuning of the large language model, and loss learning for dynamic attention head removal within the large language model.

For example, an attention head is a component in the large language model architecture. In an example, the large language model may be organized in a transformer architecture having multiple parallel layers known as attention heads. In some examples, each separate attention head may independently process and input sequence and an associated output sequence element.

More specifically, the technical solutions include using representative logs or text data for fine-tuning and evaluating the large language model. The fine-tuned large language model computes attention head importance scores using a reinforcement learning mechanism (e.g., reward mechanism). The reinforcement learning mechanism adjusts the attention head utilization based on the attention head importance scores. The adjustment of the attention head utilization has the technical effect of reducing the computing resources without affecting or reducing the accuracy and consistency of the output of the large language model. For example, the technical effect may include using smaller and/or fewer of GPUs to process the large language model while maintaining the accuracy and linguistic performance compared to other approaches or to taking no action. In this manner, a technical effect is to realize a more memory-efficient, large language model.

FIG. 1 is a block diagram of a system 100 for improving the computing resource efficiency of a large language model. The system 100 includes domain data 102, a first large language model 104, a second large language model 106, a smart reward mechanism 108, and a third large language model 110.

In the system 100, the domain data 102 is representative of data that is specific to a particular domain. Domain data 102 includes a specific category of data such as, for example, customer data, supplier data, product data, employee data, asset data, financial data, reference data, system data, and/or location data. More specifically, for example, the domain data 102 may include information technology service management (ITSM) data such as ITSM ticket data. In another example, the domain data 102 may include software and/or hardware application log data.

The domain data 102 includes a representative dataset containing data, such as the types of data listed above, that are relevant to the domain of interest. In some implementations, the domain data 102 may be preprocessed. For example, the domain data 102 may be preprocessed by tokenizing, cleaning, and/or encoding the data in such a manner that it may be used and processed by the first large language model 104.

In some implementations, the first large language model 104 may include a generic or off-the-shelf large language model. The first large language model 104 may be referred to as the original large language model. The first large language model 104 may be considered a pre-trained model, but one that is not considered fine-tuned. The domain data 102 is used to train and fine tune the first large language model 104 so that the first large language model 104 is relevant to the domain of interest.

To fine tune and train the first large language model 104, the domain data 102 is input to the first large language model 104. The first large language model 104 receives the domain data 102. Fine tuning the first large language model 104 includes adjusting the parameters of the first large language model 104 using the domain data 102. The process of fine tuning the first large language model 104 enhances the first large language model 104 to understand and generate content pertinent to the domain. The output of fine tuning the first large language model 104 using the domain data 102 is the second large language model 106.

The second large language model 106 is a fine tuned, large language model that understands and generates content pertinent to the domain of the domain data 102. The second large language model 106 includes a first memory size. The first memory size is the amount of memory space that the second large language model 106 uses on one or more memory devices and/or one or more processing devices.

Input data 112 is input to both the first large language model 104 and the second large language model 106 to generate predictions by each of the first large language model 104 and the second large language model 106. That is, the input data 112 is the same data used to generate predictions by each of the first large language model 104 and the second large language model 106. The predictions are used to calculate a loss threshold 114, which also may be referred to as a threshold.

In some implementations, the loss threshold 114 is calculated by computing performance metrics to measure the difference between the predictions of the first large language model 104 and the predictions of the second large language model 106. In some implementations, the performance metrics may include a mean squared error (MSE), where the MSE captures the extent of the dissimilarity between the predictions between the first large language model 104 and the second large language model 106.

More specifically, for example, to measure the loss threshold 114 between the first large language model 104 and the second large language model 106 both models try to predict next sentences on the input data 112. Both the first large language model 104 and the second large language model 106 output tokens in a vectorized form. The differences between the tokens is used to determine the loss threshold 114. For instance, if the first large language model 104 and the second large language model 106 both predict ten sentences using the input data 112, then ten loss values may be are obtained. The loss threshold 114 may be calculated as a single value. The loss threshold 114 may be calculated as ninety percent of the MSE of the loss values. The loss threshold 114 may be determined in other ways including using an average or mean of the loss values.

The loss threshold 114 is used to construct a smart reward mechanism 108. The smart reward mechanism 108 is used to iteratively adjust a set of attention heads of the second large language model 106. The smart reward mechanism 108 is used to identify and prioritize attention heads in the set of attention heads in a manner that maintains the accuracy of the predictions of the second large language model 106 and, at the same time, reduces the memory size of the second large language model 106.

In some implementations, the smart reward mechanism 108 uses reinforcement learning to optimize the utilization of attention heads in the second large language model 106. As the attention heads are adjusted, the input data 112 may be used to generate new predictions by the second large language model 106. The new predictions are compared to the loss threshold 114. If the new predictions have a lower loss as compared to the loss threshold 114, then the smart reward mechanism 108 awards a positive reward to the action that adjusted the attention heads. If the new predictions have a higher loss as compared to the loss threshold 114, then the smart reward mechanism 108 awards a negative reward to the action that adjusted the attention heads. The reinforcement learning performed by the smart reward mechanism 108 continues to adjust the attention heads and evaluate the impact of the adjustment by comparing the new predictions to the loss threshold 114.

The reinforcement learning process performed by the smart reward mechanism 108 decides which attention heads to adjust (e.g., by pruning one of the attention heads or retaining one of the attention heads) based on the observed rewards that are awarded. For example, each iterative action performed by the smart reward mechanism 108 may prune or remove one or more attention heads from the set of attention heads in the second large language model 106. If the second large language model 106 with the pruned attention heads has a lower loss threshold than the loss threshold 114, then a positive reward is awarded.

The final output from the process of iteratively adjusting the attention heads of the second large language model 106 is the third large language model 110. The third large language model 110 is a model that is more memory efficient because there are fewer parameters and fewer attention heads compared to the second large language model 106. The third large language model 110 includes a second memory size that is smaller than the first memory size of the second large language model 106. At the same time, the third large language model 110 still retains the ability to comprehend and generate relevant content specific to the domain of the domain data 102.

The performance of the third large language model 110 may be compared to both the first large language model 104 and the second large language model 106. For example, input data 112 or other input data may be used to generate predictions from the first large language model 104, the second large language model 106, and the third large language model 110. The predictions from the first large language model 104, the second large language model 106, and the third large language model 110 may be compared against each other for accuracy and quality. The trade-offs between the memory efficiency of the third large language model 110 and the prediction performance of the third large language model 110 may be evaluated against the prediction performance of both the first large language model 104 and the second large language model 106, both of which are not as memory efficient as the third large language model 110.

The system 100 may be implemented by at least one computing device, where the at least one computing device may include at least one memory 134 and at least one processor 136. The at least one processor 136 may represent two or more processors executing in parallel and utilizing corresponding instructions stored using the at least one memory 134. The at least one processor 136 may include at least one CPU. In some implementations, the at least one processor 136 may include at least one GPU. The at least one memory 134 represents a non-transitory computer-readable storage medium. Of course, similarly, the at least one memory 134 may represent one or more different types of memory utilized by the system 100. In addition to storing instructions, which allow the at least one processor 136 to implement the system 100, the at least one memory 134 may be used to store data and other information used by and/or generated by the system 100. The at least one memory 134 may be used to store one or more of the first large language model 104, the second large language model 106, and/or the third large language model 110. The third large language model 110 may use less memory of the at least one memory 134 and less resources of the at least one processor 136 than either of the first large language model 104 or the second large language model 106.

Figure 2:
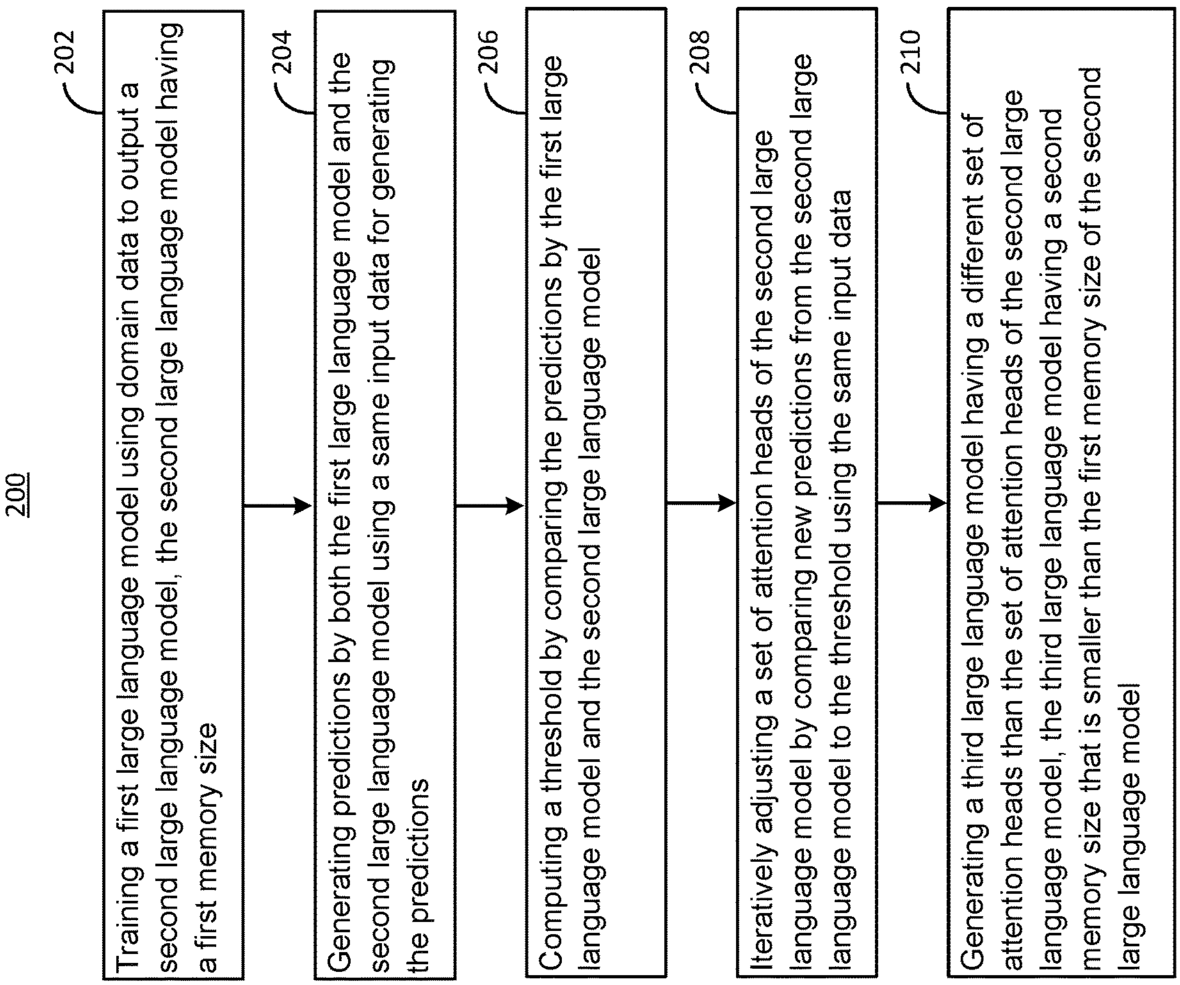
FIG. 2 is an example process illustrating example operations of the system of FIG. 1.

FIG. 2 is an example process 200 illustrating example operations of the system 100. Process 200 is a computer-implemented method that may be implemented by the system 100 and its components. Instructions and/or executable code for the performance of process 200 may be stored in the at least one memory 134, and the stored instructions may be executed by the at least one processor 136. Process 200 is also illustrative of a computer program product that may be implemented by the system 100.

Process 200 includes training a first large language model using domain data to output a second large language model, the second large language model having a first memory size (202). For example, the system 100 uses domain data 102 to train the first large language model 104 to output the second large language model 106, where the second large language model 106 has a first memory size. As discussed above, the domain data 102 is used to fine tune the first large language model 104, which may be a pre-trained large language model that is not fine tuned for a particular domain. The second large language model 106 is a fine tuned, large language model that is capable of generating and outputting predictions that are specific to the domain of the domain data 102.

Process 200 includes generating predictions by both the first large language model and the second large language model using a same input data for generating the predictions (204). For example, the input data 112 may be input to both the first large language model 104 and the second large language model 106. Both the first large language model 104 and the second large language model 106 may generate predictions using the input data 112. In some implementations, the first large language model 104 and the second large language model 106 generate predictions for the next sentences for a given input.

Process 200 includes computing a threshold by comparing the predictions by the first large language model and the second large language model (206). For example, the system 100 computes the loss threshold 114 by comparing the predictions by the first large language model 104 and the second large language model 106. In some implementations, the system 100 computes the loss threshold 114 using a MSE, where the MSE captures the extent of the dissimilarity between the predictions between the first large language model 104 and the second large language model 106. The loss threshold 114 may be a single value that is a percentage of the MSE.

Process 200 includes iteratively adjusting a set of attention heads of the second large language model by comparing new predictions from the second large language model to the threshold using the same input data (208). For example, the smart reward mechanism 108 iteratively adjusts the set of attention heads of the second large language model 106 by comparing new predictions from the second large language model 106 to the loss threshold 114 using the input data 112.

In some implementations, the smart reward mechanism 108 performs the iterative adjusting by temporarily removing at least one attention head from the set of attention heads of the second large language model 106. The smart reward mechanism 108 calculates a reward function with the at least one attention head removed. Then, the smart reward mechanism 108 permanently removes the at least one attention head from the set of attention heads based on the reward function. For example, if the prediction output by the second large language model 106 with the at least one attention head removed is within the loss threshold 114 tolerance, then the smart reward mechanism 108 awards a positive reward and the at least one attention head may be permanently removed. That is, the at least one attention head is removed from the second large language model 106 when there is no loss in accuracy or at least an acceptable loss in accuracy that when compared to the loss threshold 114.

In some implementations, the smart reward mechanism 108 retains the at least one attention head in the set of attention heads when the reward function indicates a loss of accuracy in the new predictions by the second large language model 106 when compared to the loss threshold 114. That is, the smart reward mechanism 108 re-adds the temporarily removed at least one attention head back to the second large language model 106.

In some implementations, the smart reward mechanism 108 temporarily removes the at least one attention head from the set of attention heads of the second large language model 106 by randomly selecting the at least one attention head for temporary removal. That is, there may be no particular criteria used to select an attention head for temporary removal to test whether the attention head should be permanently removed or retained.

In some implementations, the smart reward mechanism 108 temporarily removes the at least one attention head from the set of attention heads of the second large language model 106 by using an activation score. An activation score is a value given to an attention head that indicates the relevance of the attention head to the prediction. For example, an attention head with a low activation score or no activation score for a particular prediction may be selected for temporary removal to determine whether or not the attention head should be permanently removed using the smart reward mechanism 108.

In some implementations, the process step of iteratively adjusting the set of attention heads may be stopped in response to the new predictions being below the loss threshold 114. In some instances, the iteratively adjusting process is stopped when the new predictions are consistently below the loss threshold 114 for a number of predictions.

Process 200 includes generating a third large language model having a different set of attention heads than the set of attention heads of the second large language model, the third large language model having a second memory size that is smaller than the first memory size of the second large language model (210). For example, the third large language model 110 is generated, where the third large language model 110 has a different set of attention heads than the set of attention heads for the second large language model 106. Additionally, the third large language model 110 has a second memory size that is smaller than the first memory size of the second large language model 106. That is, the third large language model 110 uses less of the at least one memory 134 and/or less processing resources of the at least one processor 136 than the second large language model 106 while maintaining a same or similar level of accuracy in predictions as the second large language model 106 for the domain of the domain data 102.

Figure 3:
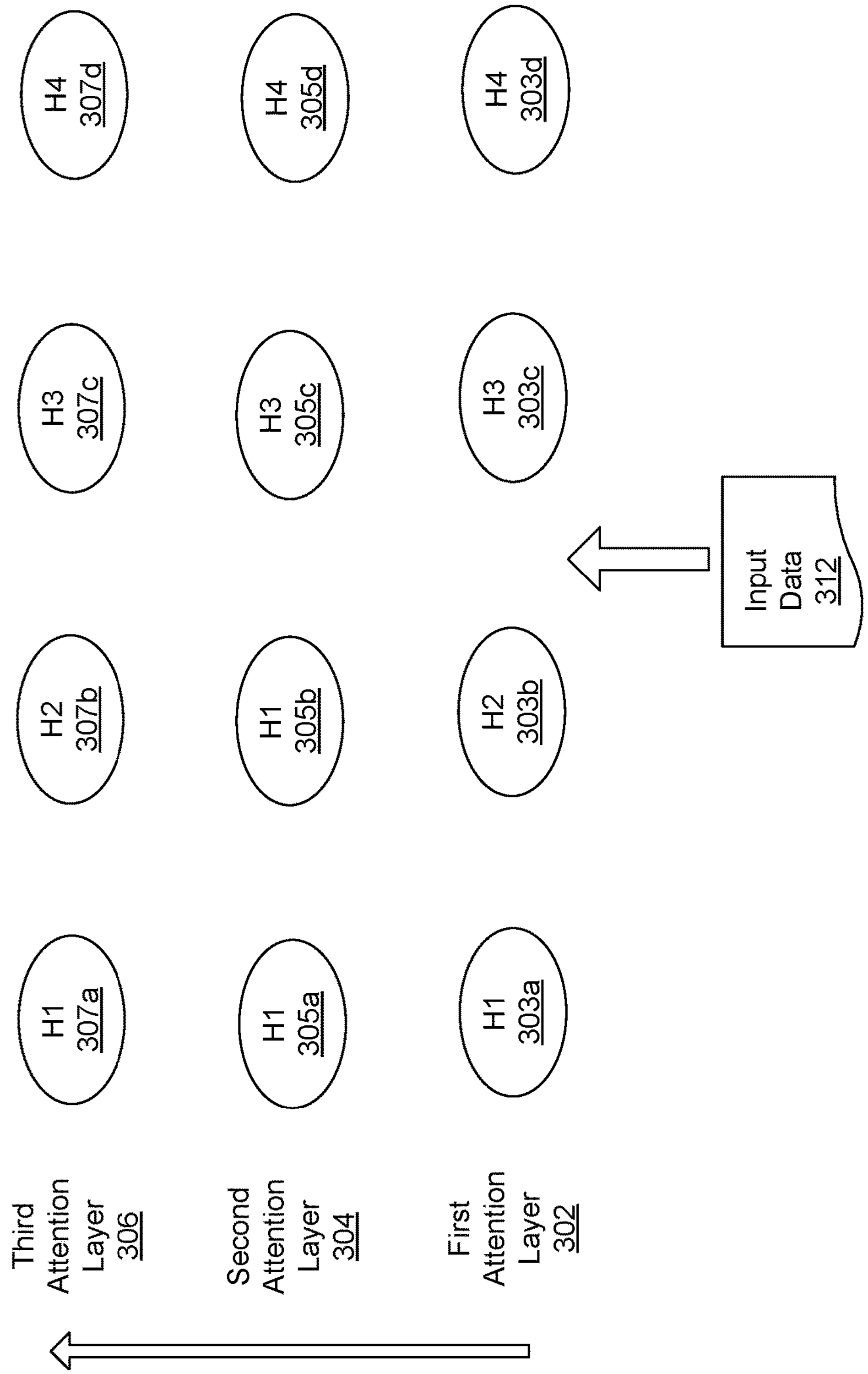
FIG. 3 is an example schematic of a large language model with attention heads.

FIG. 3 is an example schematic of a large language model 300 with attention heads, where all attention heads are activated and being used in the large language model 300. For example, the large language model 300 may use a transformer architecture with an encoder and a decoder having multiple attention layers with each attention layer having multiple attention heads. The large language model 300 with the multiple attention layers may be the type of architecture used for the first large language model 104, the second large language model 106, and the third large language model 110.

In this simplified example, the large language model 300 includes a first attention layer 302, a second attention layer 304, and a third attention layer 306. Input data 312 is processed by each of the attention layers: the first attention layer 302, the second attention layer 304, and the third attention layer 306. Each of the attention layers includes multiple attention heads, all of which are activated.

For example, the first attention layer 302 includes attention heads H1 303*a*, H2 303*b*, H3 303*c*, and H4 303*d*. The second attention layer 304 includes attention heads H1 305*a*, H2 305*b*, H3 305*c*, and H4 305*d*. The third attention layer 306 includes attention heads H1 307*a*, H2 307*b*, H3 307*c*, and H4 307*d*. As the input data 312 is processed by the first attention layer 302, the second attention layer 304, and the third attention layer 306, the attention heads within each of the layers are assigned an attention score.

For instance, the input data 312 may be the sentence "The quick brown fox jumps over the lazy dog." The output of the large language model 300 is to predict the next sentence. In this example, the large language model 300 may be an example of the second large language model 106 of FIG. 1.

In this example, H1 303*a*, 305*a*, and 307*a* may focus on capturing the key context of the input data 312 and may assign high attention scores to word like "The," "fox," "jumps," "the," and "dog." H2 303*b*, 305*b*, and 307*b* may emphasize the subject-verb relationships and assign high scores to words like "quick" and "over." H3 303*c*, 305*c*, and 307*c* may give priority to nouns and/or adjectives and assign high scores to words like "brown," "fox," lazy," and "dog." H4 303*d*, 305*d*, and 307*d* may have a more evenly distributed attention and assign attention scores more evenly across the words.

The system 100 and the process 200 determine which attention heads may be pruned because the accuracy of the prediction by the large language model 300 is not affected by the removal of the particular attention heads. The process 200 is followed to determine a loss threshold and to compare the predictions of the large language model 300 relative to the loss threshold to determine which attention heads to prune. The system 100 and the process 200 do not prune or remove attention heads based on the attention scores assigned as the input data 312 is processed by the large language model 300.

The smart reward mechanism 108 uses reinforcement learning to identify and prune attention heads from the large language model 300, as discussed above. In some implementations, the attention heads are pruned by setting their weights to zero.

Figure 4:
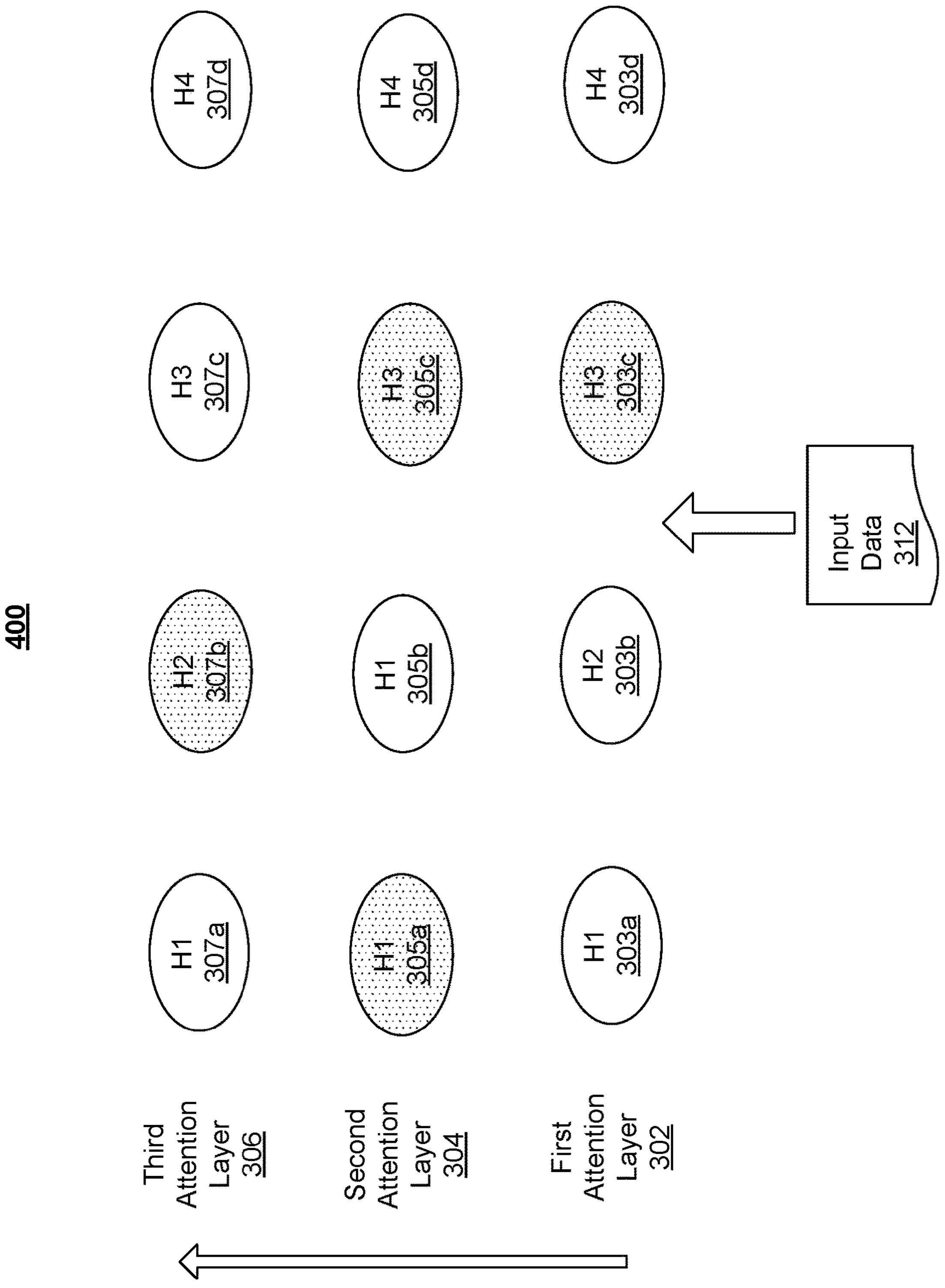
FIG. 4 is an example schematic of a large language model with multiple attention heads removed.

FIG. 4 is an example schematic of a large language model 400, with multiple attention heads removed. In this example, the large language model 400 may be like the third large language model 110 of FIG. 1. In this example, the system 100 and the process 200 determined that H1 305*a*, H2 307*b*, H3 303*c* and H3 305*c* may be removed without affecting the accuracy of the predictions output by the large language model 400. With the attention heads removed, the large language model 400 results in a smaller memory size and uses less memory and processing resources (e.g., less GPU resources) than large language model 300, but still outputs predictions with the same or similar accuracy.

The terminology used herein is for the purpose of describing particular example implementations only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as “first,” “second,” and other numerical terms when used herein do not imply a sequence or order unless clearly indicated by the context. Thus, a first element, component, region, layer, or section discussed below could be termed a second element, component, region, layer, or section without departing from the teachings of the example implementations.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

What is claimed is:

1. A computer-implemented method comprising:

training a first large language model (LLM) using domain data to output a second LLM, the second LLM having a first memory size;

generating predictions by both the first LLM and the second LLM using a same input data for generating the predictions;

computing a threshold by comparing the predictions by the first LLM and the second LLM;

iteratively adjusting a set of attention heads of the second LLM by comparing new predictions from the second LLM to the threshold using the same input data, wherein iteratively adjusting the set of attention heads includes:

temporarily removing at least one attention head from the set of attention heads of the second LLM, calculating a reward function with the at least one attention head removed, and permanently removing the at least one attention head from the set of attention heads based on the reward function, wherein permanently removing the at least one attention head includes permanently removing the at least one attention head when the reward function indicates no loss of accuracy in the new predictions in the second LLM when compared to the threshold; and generating a third LLM having a different set of attention heads than the set of attention heads of the second LLM, the third LLM having a second memory size that is smaller than the first memory size of the second LLM.

2. The computer-implemented method of claim 1, wherein the third LLM and the second LLM have a similar accuracy.

3. The computer-implemented method of claim 1, further comprising:

generating additional predictions for both the second LLM and the third LLM using new data; and comparing the additional predictions for both the second LLM and the third LLM, wherein an accuracy of the additional predictions for the third LLM is similar to an accuracy of the additional predictions for the second LLM.

4. The computer-implemented method of claim 1, further comprising:

retaining the at least one attention head in the set of attention heads when the reward function indicates a loss of accuracy in the new predictions in the second LLM when compared to the threshold.

5. The computer-implemented method of claim 1, wherein temporarily removing the at least one attention head from the set of attention heads of the second LLM includes randomly selecting the at least one attention head for temporary removal.

6. The computer-implemented method of claim 1, wherein temporarily removing the at least one attention head from the set of attention heads of the second LLM includes selecting the at least one attention head for temporary removal using an activation score.

7. The computer-implemented method of claim 1, further comprising stopping iteratively adjusting the set of attention heads of the second LLM in response to the new predictions being below the threshold.

8. A computer program product, the computer program product being tangibly embodied on a non-transitory computer-readable medium and comprising instructions that, when executed by at least one computing device, are configured to cause the at least one computing device to:

train a first large language model (LLM) using domain data to output a second LLM, the second LLM having a first memory size;

generate predictions by both the first LLM and the second LLM using a same input data for generating the predictions;

compute a threshold by comparing the predictions by the first LLM and the second LLM;

iteratively adjust a set of attention heads of the second LLM by comparing new predictions from the second LLM to the threshold using the same input data, wherein iteratively adjusting the set of attention heads includes:

temporarily removing at least one attention head from the set of attention heads of the second LLM, calculating a reward function with the at least one attention head removed, and permanently removing the at least one attention head from the set of attention heads based on the reward function, wherein permanently removing the at least one attention head includes permanently removing the at least one attention head when the reward function indicates no loss of accuracy in the new predictions in the second LLM when compared to the threshold; and generate a third LLM having a different set of attention heads than the set of attention heads of the second LLM, the third LLM having a second memory size that is smaller than the first memory size of the second LLM.

9. The computer program product of claim 8, wherein the third LLM and the second LLM have a similar accuracy.

10. The computer program product of claim 8, wherein the instructions, when executed, are further configured to cause the at least one computing device to:

generate additional predictions for both the second LLM and the third LLM using new data; and compare the additional predictions for both the second LLM and the third LLM, wherein an accuracy of the additional predictions for the third LLM is similar to an accuracy of the additional predictions for the second LLM.

11. The computer program product of claim 8, wherein the instructions, when executed, are further configured to cause the at least one computing device to:

retain the at least one attention head in the set of attention heads when the reward function indicates a loss of accuracy in the new predictions in the second LLM when compared to the threshold.

12. The computer program product of claim 8, wherein temporarily removing the at least one attention head from the set of attention heads of the second LLM includes instructions that, when executed, are further configured to cause the at least one computing device to:

randomly select the at least one attention head for temporary removal.

13. The computer program product of claim 8, wherein temporarily removing the at least one attention head from the set of attention heads of the second LLM includes instructions that, when executed, are further configured to cause the at least one computing device to:

select the at least one attention head for temporary removal using an activation score.

14. The computer program product of claim 8, wherein the instructions, when executed, are further configured to cause the at least one computing device to stop iteratively adjusting the set of attention heads of the second LLM in response to the new predictions being below the threshold.

15. A system comprising:

at least one memory including instructions; and at least one processor that is operably coupled to the at least one memory and that is arranged and configured to execute instructions that, when executed, cause the at least one processor to:

train a first large language model (LLM) using domain data to output a second LLM, the second LLM having a first memory size;

generate predictions by both the first LLM and the second LLM using a same input data for generating the predictions;

compute a threshold by comparing the predictions by the first LLM and the second LLM;

iteratively adjust a set of attention heads of the second LLM by comparing new predictions from the second LLM to the threshold using the same input data, wherein iteratively adjusting the set of attention heads includes:

temporarily removing at least one attention head from the set of attention heads of the second LLM, calculating a reward function with the at least one attention head removed, and permanently removing the at least one attention head from the set of attention heads based on the reward function, wherein permanently removing the at least one attention head includes permanently removing the at least one attention head when the reward function indicates no loss of accuracy in the new predictions in the second LLM when compared to the threshold; and generate a third LLM having a different set of attention heads than the set of attention heads of the second LLM, the third LLM having a second memory size that is smaller than the first memory size of the second LLM.

16. The system of claim 15, wherein the at least one processor includes at least one graphics processing unit (GPU) and the third LLM uses fewer processing resources of the at least one GPU than the second LLM.

* * * * *